United States Patent [19]

Gibbs

[11] Patent Number: 4,962,845
[45] Date of Patent: Oct. 16, 1990

[54] CONVEYER BELT SCRAPING APPARATUS

[75] Inventor: A. Todd Gibbs, Allentown, Pa.

[73] Assignee: ASGCO Manufacturing, Inc., Allentown, Pa.

[21] Appl. No.: 385,627

[22] Filed: Jul. 26, 1989

[51] Int. Cl.⁵ .............................................. B65G 45/00
[52] U.S. Cl. ................................................. 198/499
[58] Field of Search ........................... 198/497, 499; 15/256.51, 256.5

[56] References Cited

U.S. PATENT DOCUMENTS

| | | | |
|---|---|---|---|
| 3,722,667 | 3/1973 | Olson | 198/499 |
| 3,994,385 | 11/1976 | Reiter | 198/499 |
| 4,269,301 | 5/1981 | Gibbs | 198/499 |
| 4,402,394 | 9/1983 | Stoll | 198/499 |
| 4,533,035 | 8/1985 | Reiter | 198/499 |
| 4,533,036 | 8/1985 | Gordon | 198/499 |
| 4,541,523 | 9/1985 | Stockman | 198/499 |
| 4,598,823 | 7/1986 | Swinderman | 198/499 X |
| 4,633,999 | 1/1987 | Perneczky | 198/499 |
| 4,662,507 | 5/1987 | Veenhof | 198/499 |
| 4,696,389 | 9/1987 | Schwarze | 198/499 |
| 4,768,644 | 9/1988 | Cromm | 198/499 |

FOREIGN PATENT DOCUMENTS

| | | | |
|---|---|---|---|
| 0215416 | 9/1987 | Japan | 198/499 |
| 0247214 | 10/1988 | Japan | 198/499 |
| 2053121 | 2/1981 | United Kingdom | 198/499 |

OTHER PUBLICATIONS

ASGCO Product Brochure, 12/1983.
ASGCO Product Brochure, 5/1988.

*Primary Examiner*—H. Grant Skaggs
*Assistant Examiner*—D. Glenn Dayoan
*Attorney, Agent, or Firm*—Dann, Dorfman, Herrell & Skillman

[57] ABSTRACT

A belt scraper for cleaning the conveyor belt on a cylindrical pulley including a plurality of scraping blades having transverse scraping edges at the leading end of the blade side surface which faces the conveyor belt. The side surfaces are tangential to and resiliently against the belt by a transverse rotary shaft parallel to the scraping edge. A separate blade support element connects each blade to the shaft so that the blades extend across the belt width, and includes a torsion element providing an additional point of rotation between the scraping blade and the rotary shaft located transverse to force the blade to pivot away from the belt surface upon impact by an object moving with the belt into engagement with the blade against the scraping edge.

18 Claims, 4 Drawing Sheets

CONVEYER BELT SCRAPING APPARATUS

The present invention is directed to an apparatus for scraping and cleaning the surfaces of endless conveyor belts.

Field of the Invention

The use of conveyor belt scrapers (more commonly known as doctor blades or primary scrapers) to remove accumulated material from endless conveyor belts is known in the art. Such scrapers are employed to eliminate the buildup of material on the belt itself, which buildup can in turn lead to a transfer of buildup on the pulleys, idlers and other elements of the conveyor belt system resulting in increased maintenance costs and shutdown of the operation.

Conventional belt scrapers are attached to a transverse support member and mounted tangentially to the head or drive pulley. Generally, these belt scrapers are tensioned by ratchets, counter weights, air cylinders, air bags, springs, etc. As the blade wears with time, the transverse support member is rotated in the direction of the head pulley, changing the angle of the blade relative to the pulley being cleaned.

Such belt scraper systems may be mounted to effect scraping at about 6 o'clock or less on the head pulley. For example, U.S. Pat. No. 4,696,389 discloses a mounting for a belt scraper assembly designed to clean at or near the head pulley of a conveyor belt system. However, as is apparent from FIGS. 5 and 6 of this patent, this apparatus could not be used at a position further than 6 o'clock on the head pulley. Likewise, U.S. Pat. No. 4,633,999 discloses a self-adjusting apparatus for use in cleaning the surface of conveyor belts. The structure is adjustable, rotatable and contains torsion elements. However, as can be seen in FIG. 1, the apparatus of this patent could not be used at a position further than 6 o'clock on the head pulley. U.S. Pat. No. 4,533,036 discloses a scraping apparatus comprising a plurality of scraping blades mounted on single or multi-armed resilient supports mounted on or about 6 o'clock on the head pulley.

However, it is desirable to clean conveyor belt systems at between 7 o'clock and 10 o'clock on the head pulley, with respect to effective cleaning, as well as space considerations. Scraping at between 7 and 10 o'clock on the head pulley provides maximum cleaning results, since the belt is elongated at its maximum tension and all of the pores of the belt are exposed to the scraping action of the doctor blade. Moreover, scraping at between 7 and 10 o'clock on the head pulley allows all material to fall directly into the chute below, minimizing space limitations and other design problems. It is further desirable to apply the greatest amount of scraping pressure on the conveyor belt at between 7 and 10 o'clock on the head pulley, while simultaneously having a system which would minimize damage to both the doctor blade and conveyor belt.

Applicant's co-pending application Ser. No. 483,959, filed Feb. 2, 1990, which is a continuation of Ser. No. 209,457, filed June 20, 1988, discloses an apparatus for scraping conveyor belts on the head pulley, which comprises a plurality of scraping blades which are in a side-by-side relation and dependent upon each other for lateral support. This apparatus may not be placed at a position higher than about 6 o'clock on the head pulley.

Conveyor belt cleaning systems positioned at between 7 and 10 o'clock on the head pulley have been used commercially. For example, assignees' Skalper I™ and II™ (by Asgco Mfg. Inc., Allentown, Pa.) may be positioned at about 7 o'clock or higher on the head pulley of a conveyor belt, but this scraper has no provision for deflecting the blade when it is struck by a mechanical fastener, clip or other foreign object.

Figure 7:
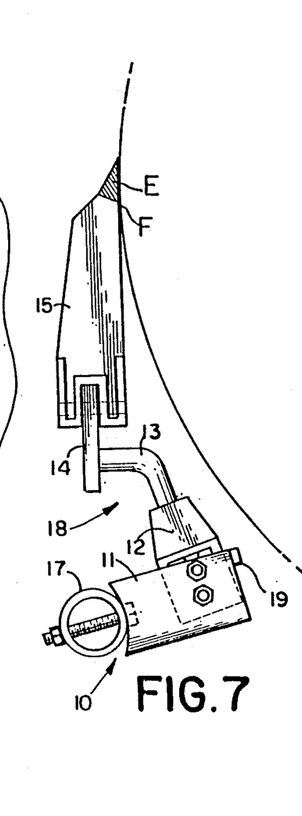
FIG. 7 is a view of a scraping apparatus wherein the blade has been damaged due to contact with a foreign object on the belt.

As noted above, conventional scraper blade systems are mounted directly to a transverse support element. When the blades of these systems come in contact with mechanical fasteners, clips or other foreign objects of the belt, the tendency, from a geometric standpoint, is for the blade to deflect down and into the impacting force of the mechanical fasteners or the like. Only the forgiving nature of the blade material, usually urethane, causes the blade to deflect away from the impacting forces. This deflection of the blade is caused by a build up of energy in the deformation of the blade until it springs away from the impacting force. Thus, an impacting force is absorbed by the blade causing, cutting, tearing, abrading or breaking the tip of the blade itself or gouging or other damage to the belt. When the blade is chipped, broken, gouged, cut or abraded, it allows an area of material to accumulate (similar to an internal stonebox or ledge) causing a situation wherein the material abrades the belt (see FIG. 7). In FIG. 7, F represents a broken blade tip and E represents material buildup on the blade.

Generally, the damage described above is caused by two forces. The first being the impact of the mechanical fastener, since the fastener is generally at a position higher or thicker than the belt or even recessed into the belt. As the fastener or other foreign object on the belt revolves around the head pulley striking the blade tips at a tangential point, the force generally wants to move the blade downward. However, if the blade cannot move downward, or cannot move downward with sufficient speed, the fasteners or foreign objects will rip, tear or break out the unforgiving portion of the blade, thereby cutting, scoring, breaking and/or chipping the blade as it passes along the belt. That is, if the blade or tensioning system is too stiff, the transverse support member will bend away from the forces being exerted upon it or the belt itself may be damaged.

The second force noted above occurs when the belt is thicker at the point wherein the mechanical fastener is attached, thus applying more blade pressure to the belt. This causes that point of the belt to be abraded to a much higher degree by the affixed tension blade. This phenomena can also be seen where two belts of different thicknesses are mechanically spliced or vulcanized together. If the scraping blade arrangement is tensioned to the thickness of the thinner portion of the belt, when the thicker portion of the belt passes the doctor blade, the blade or belt has significantly more tension exerted upon it. This again causes undue abrasion on the thicker portion of the belt and possible damage to the scraping blade.

Accordingly, in order to avoid these problems, conventional scraping blades are installed in such a manner so as to exert a minimal amount of pressure on the belt, i.e. usually well under three pounds per inch of pressure. The rationale behind this design is that the greater the degree of pressure applied to the scraping blade, the higher the degree of impact will be upon the blade itself, as the blade encounters the above-noted forces. However, the use of such minimal pressure does not allow for optimum cleaning of the conveyor belt.

Presently, doctor blades are generally composed of 90–95 durometer urethane with ceramic beads in a matrix of urethane forming the blade edge. These blades have been used successfully for years on belts which are vulcanized and which contain no foreign objects, such as mechanical fasteners, clips, embedded stone particles, etc., on the surfaces thereof. However, once such foreign objects are introduced to the belt surface, these blades may be caught on the mechanical clips, etc., and cause the ceramic beads to chunk out, gouge out or impact. This can occur to the extent of grabbing the blade or blades and bending the support members away from the belt, while at the same time grabbing the tip of the blade and causing it to rotate in the direction of the belt. This has been shown to cause both breakage of the blade and damage to the belt.

Therefore, cleaning systems for belts containing mechanical fasteners, clips, etc., normally do not use blades with ceramic beads, but rather employ blades having a 100% urethane construction. However, any excess pressure on such blades caused by the mechanical fasteners or the like will tend to cause the blade assembly to flip over and possibly bend the support member. Thus, it has become increasingly important to de-emphasize the use of pressure on doctor blades used on conveyor belts containing mechanical fasteners. In this regard, the least amount of pressure on the blades will insure a greater life for the blade and the entire apparatus. However, as indicated above, the use of the minimal amount of pressure also minimizes the amount of cleaning of the belt.

In order to overcome this problem, present scraping blade systems rely on the physical properties of the urethane to allow for movement away from the mechanical fasteners. However, these designs have proven to be ineffective.

Accordingly, the object of the present invention is to provide a conveyor belt scraping apparatus which provides maximum cleaning at the head pulley, while minimizing space and design difficulties. Another object of the present invention is to provide a conveyor belt scraping apparatus which minimizes damage to the conveyor belt scraping blades and the conveyor belt itself from mechanical fasteners, clips and other foreign objects present on the belt.

Summary of the Invention

The present invention is directed to a apparatus for cleaning conveyor belts at between 7 and 10 o'clock at the head pulley of the belt comprising:

(1) a transverse support member positioned in spaced relation to the surface of the conveyor belt;

(2) a plurality of resilient blade support elements mounted on the transverse support member in an array across the belt width, each of the blade support elements including resilient means providing a point of rotation relative to the support member; and (3) a plurality of resilient scraping blades attached to the blade support elements. Each scraping blade extends into engagement with the belt surface. The point of rotation is positioned inward towards the pulley relative to the engagement of the scraping blades with the belt, forcing the blades to pivot away from the belt surface.

Detailed Description of the Invention

In the conveyor belt scraping apparatus of the present invention, each of the scraping blade is attached to one of a plurality of blade support elements, which in turn is attached to a single transverse support member positioned in spaced relation to the surface of the conveyor belt. Preferably, the transverse support member is a rotatable shaft, allowing for tensioning of the scraping apparatus. The support member is also preferably positioned transversely to the conveyor belt and in spaced relation to the belt.

The support elements are attached on opposite ends to the traverse support member and the scraping blades. The support elements preferably comprise an elastomeric torsion element. For example, the support element may comprise a Lovejoy ® elastomeric oscillating drive head, type ST element. The support element can act as a spring and/or damper or shock absorber for the scraper blades themselves. It is preferred that an angular movement of about 30° or less is provided by the support element.

Figure 1:
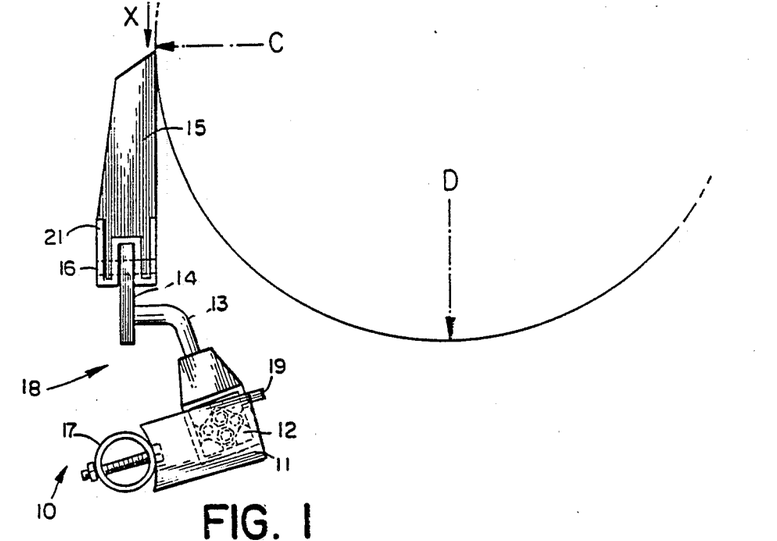
FIG. 1 is a view of the present conveyor belt scraping apparatus as installed against the head pulley of a conveyor belt.

As can be seen in FIG. 1, in one embodiment of the present invention, the conveyor belt scraping assembly 10 may comprise a blade support bracket 11, housing the support element 18. The support element 18 comprises an elastomeric torsion element 12, a support arm 13, and an anchor plate 14. The support bracket 11 is fixedly connected on one end to a single transverse support member 17 (preferably, a rotatable shaft) by any conventional means. The elastomeric torsion element 12 is itself fixedly attached to the support bracket 11 by any conventional means, e.g., mounting bolts. The scraping blade 15 is attached to one end of the anchor plate 14 with a pin 16. The opposing end of the anchor plate 14 is attached to one end of the support arm 13 and pinned. The support arm 13 is connected at its opposing end to the torsion device 12 and pinned.

As can best be seen in FIG. 1, the torsion elements 12 of the present invention are positioned so that they are spaced away from the center of the support member 17. The support elements 18 provide a point of rotation relative to the transverse support member 17, allowing the support element and blade to pivot upon contact with a foreign object on or in the belt. This point of rotation is positioned inward relative to the point of engagement of the blade and belt in a direction towards the pulley. This placement allows the blades to pivot down and away from the belt surface upon contact with the clip or other object.

It should be noted that the tip of the blade at C forms a scraping edge between the end surface and the side surface of the blade which faces the conveyor belt. This side surface is generally tangential to the cylindrical surface of the head pulley, so that as the blade wears away, the scraping edge remains sharp. The support member 17 is spaced from the blade and is substantially coplanar with the side surface of the blade so that as the rotary support member is biased toward the belt, the scraping edge of the tip of the blade is maintained in engagement with the belt. The support member is generally parallel to the scraping edge, as is the pivotal axis of the torsion device 12. The point of rotation in the torsion device is spaced radially inwardly between the support shaft 17 and the head pulley so that the torsion element 12 is positioned between the support shaft and the surface of the head pulley. As shown, the support arm extending from one part of the torsion device 12 is generally at right angles to the bracket 11 supporting the other part of the torsion device.

As a safety device, as shown in FIG. 1, the present assembly further comprises a safety stop 19 on the support bracket 11. The safety stop 19 may be, e.g., a rigid transverse lip extending across and outward from the front of the bracket 11. If for any reason the blade is drawn into the direction of belt travel (i.e., a clockwise movement rather than a counter clockwise movement), the torsion device 12 will be restrained from further movement upon coming in contact with the safety stop 19. The safety stop 19 is attached to the support bracket 11 by welding and becomes a permanent part of the support bracket 11. It is intended that the movement of the blade 15 be strictly away from the belt, that is counterclockwise as shown in the drawings, when impacted by forces in or on the belt shown in FIG. 1, as clockwise movements would allow damage to occur to the belt. If for any reason the impacting forces of an object on or in the belt cause the blade 15 to rotate in a clockwise direction, the safety stop 19 will stop the movement of the torsion element 12 and the forces of impact will act upon the blade tip causing breakage, cutting or tearing, but will not allow the anchor plate 14, support arm 13 or torsion element 12 to rotate into the belt causing severe damage to the belt. It is preferred that only a 30° movement in a counterclockwise direction is allowed.

The anchor plate 14 may be attached to the support arm 13 by any conventional means such as by threads. The blade 15 is attached to the plate 14 by a drift pin 16 of a predetermined tensile strength extending through the inverted channel 21 at the bottom of blade 15.

The entire anchor assembly of the present apparatus may be encapsulated by a urethane molded blade around all sides of the channel plate 21 but the bottom. This design leaves the bottom of the anchor plate available for attachment to the support arm.

The transverse support member 17 acts as a tensioning device for the present scraping apparatus. Preferably, the transverse support member 17 comprises a rotatable shaft or a conventional torsion tube. Alternatively, a take-up such as the Telescoper ® (manufactured by Bryant Products, Inc., Asshippun, Wis.) may be used as the transverse support member.

Figure 2:
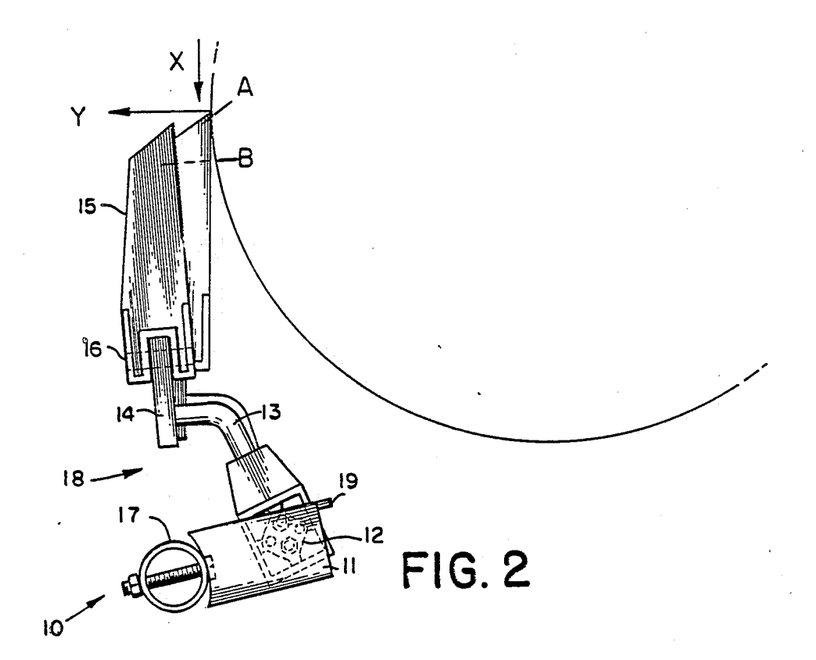
FIG. 2 is a further view of the present apparatus installed on the head pulley of a conveyor belt, demonstrating the movement of the apparatus when impacted by an object in or on the belt.

As demonstrated in FIG. 2, if a mechanical fastener or other foreign object moves into engagement with the blade against the scraping edge at the blade tip, the blade 15 is forced down and away from the belt surface. In FIG. 2, the belt is moving in direction X. A mechanical fastener or other foreign object (not shown) contacts the blade tip causing the blade 15 to move down and away from the belt surface, pivoting on a point of rotation centered in the torsion device 12. In FIG. 2, A represents the original position of the scraping blade 15 prior to contact with the foreign object. Upon contact, the blade will move towards Position B, i.e., down and away from the belt, and then return to the belt surface.

This movement is primarily due to the off-center positioning of each scraping blade 15 in relation to the blade support element, in a curvilinear direction outward from the belt surface. More specifically, a point of rotation is provided by the blade support elements relative to the support member. The point of rotation is positioned inward toward the pulley relative to the point of engagement of the scraping blades with the belt. As can be seen in FIG. 1, the line of force acting through the torque or movement arm created by the off-center design causes the tendency for the rotational movement down and away from the contact point on the belt, rather than allowing the foreign object to grab the blade 15 and pull it into the belt and/or bend the transverse support member 17. This right angle or off-center design in combination with the presence of the elastomeric torsion element 12, allows the scraping blades to react to forces of impact or thickness, i.e., to pivot down and away from the belt. Moreover, the elastomeric torsion element 12 allows the blade 15 to quickly return to its original position to allow for further scraping and cleaning of the belt with little or no damage to the blade or belt. This movement, therefore, allows the scraping blades 15 to react to the foreign object, without either suffering damage itself or causing damage to the belt surface.

Similarly, if the belt were to reverse its movement, the present apparatus would not allow damage to be caused to the blade or belt. Upon reversal in direction, the present system will only cause material to be smeared on the belt.

Figure 4:
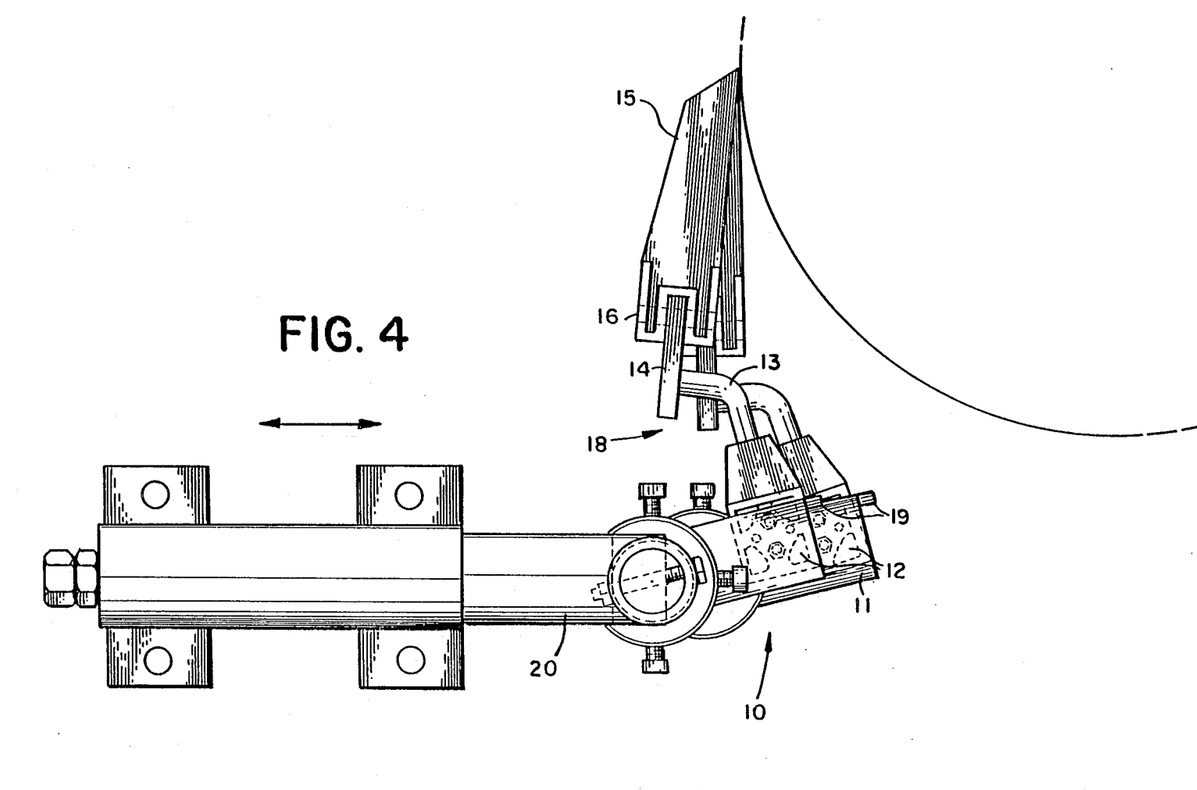
FIG. 4 is a view of the conveyor belt scraping apparatus demonstrating the tensioning of the apparatus by displacing the transverse support member in a linear direction towards the pulley.
Figure 5:
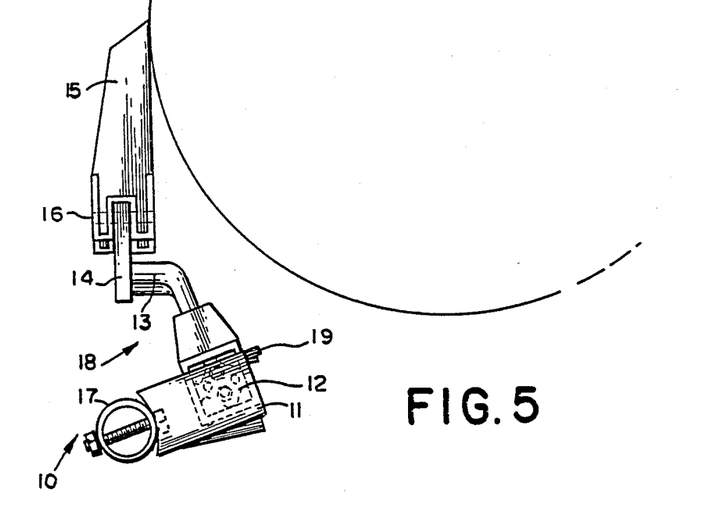
FIG. 5 is a view of the conveyor belt scraping apparatus demonstrating the tensioning of the apparatus by rotating the transverse support member in a clockwise direction.

The present conveyor belt scraping apparatus may be tensioned in order to increase or decrease the scraping force on the belt. As shown in FIG. 4, one method of installation and tensioning of the present apparatus is to use a takeup as transverse support member 17 and to displace the transverse support member 17 in a linear direction toward the pulley. The transverse support member can be displaced in a linear direction, either towards or away from the belt as shown by the arrow in FIG. 4. FIG. 5 demonstrates the tensioning of the present assembly when using a rotatable shaft, i.e., by rotating the transverse support member 17 in a clockwise direction towards the belt surface.

With regard to installation of the present assembly on a conveyor belt, in FIG. 2, A represents the original point of contact. Once the units have been tensioned the appropriate degree for proper belt scraping pressure, the blades will move in a downward position, i.e., toward B, upon contact with a foreign object on the belt.

At 20° of tension, there exists a scraping pressure of about 5.5–6 lbs. per linear inch of width of each blade. In contrast, conventional scrapers are generally installed with well under 3 lbs. per linear inch of pressure. Accordingly, for a 36-inch wide scraping blade, there would be approximately 216 lbs. per linear inch of scraping force exerted on the belt. In FIG. 2, B illustrates the reaction of the blade and torsioning unit upon forces of impact by a mechanical fastener or the like. It can be seen that due to the unique design of the present invention, even with 216 lbs. of total scraping force on the belt, the appropriate reaction (i.e., the down and away movement) will occur if the scraping blades are impacted by a mechanical fastener, clip, etc.

As noted above, it is preferred that the blade support element of the present invention comprise an elastomeric torsion element 12, such as a Lovejoy® elastomeric element, the torsion element being fixedly attached to a support bracket 11. The Lovejoy® elastomeric element is preferred since it has the capability to allow an infinitely random response to forces acting on the blade and will further re-position itself to these forces within 30 degrees of the area.

The scraping blades 15 which may be used in the present invention may be formed from any conventional substance. However, it is preferred that the scraping blades be composed of an elastomeric material (e.g., urethane), a polymeric material (e.g., Ultra High Molecular Weight Polymer, e.g., Tivar®-100 manufactured by Poly-Hi, Fort Wayne, Ind.), a ceramic material, or steel. When the scraper blades are composed of elastomeric or polymeric material, it is further preferred that the blades contain ceramic beads embedded in the tips of the blades.

The conveyor belt scraping apparatus of the present invention is located at a position between about 7 o'clock and about 10 o'clock on the head pulley at a position approximately tangential to the head pulley. This positioning of the scraping apparatus can best be seen in FIG. 1, wherein C represents 9 o'clock and D represents 6 o'clock on the head pulley. Preferably, the present conveyor belt scraping apparatus is positioned at about 9 o'clock on the head pulley. This positioning allows for improved cleaning, as well as minimization of space and design considerations.

Another advantage is that by cleaning between 7 o'clock and 10 o'clock on the head pulley, the present scraping apparatus may be used as a primary scraper. Therefore, the present apparatus may be used in combination with other conveyor belt cleaners, which may be positioned at about 6 o'clock, to allow for more effective secondary cleaning of the belt surface.

The determination as to where between 7 o'clock and 10 o'clock at the head pulley the present scraping apparatus is to be positioned, is dependent upon, at least in part, the speed of the belt and the type of material being cleaned from the belt. Specifically, if the belt is moving at a comparatively fast rate of speed, the material will be forced off of the belt at a position equivalent to approximately 10 to 11 o'clock. Accordingly, in this situation, the scraping apparatus should be positioned at about 9 o'clock on the head pulley. However, if the belt is moving at a slower rate of speed, the material will stay on the belt for a longer period of time, i.e., until approximately 9 o'clock on the head pulley, before falling into the chute. Accordingly, in this situation, it would be preferred to position the present scraping apparatus at approximately 7 o'clock on the head pulley, in order to maximize cleaning and scraping efficiency and to keep the scraper out of the direct flow of material.

Figure 3:
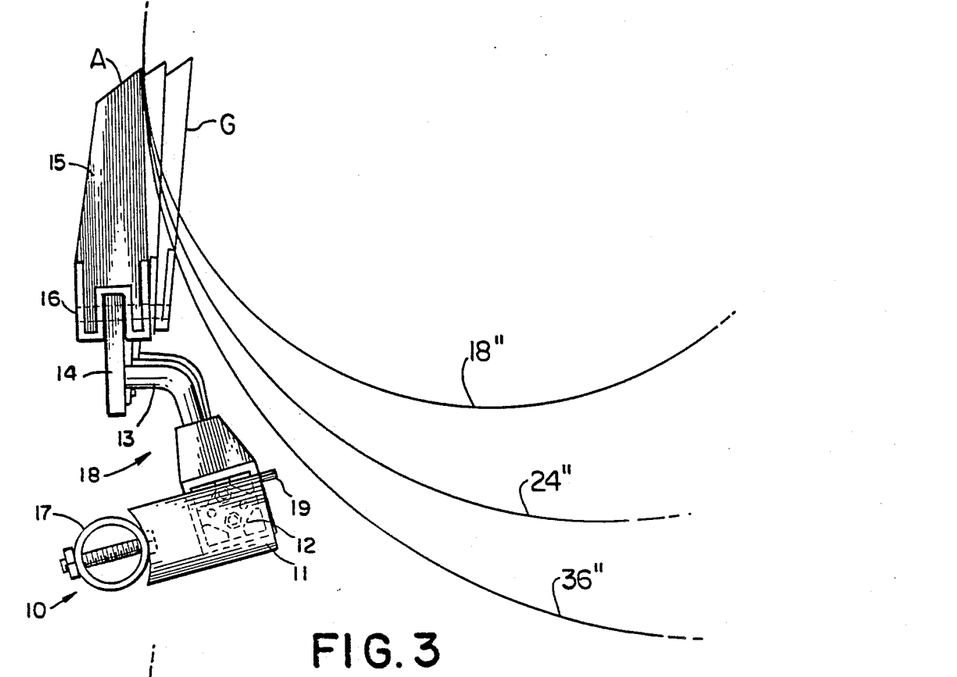
FIG. 3 is a view of the conveyor belt scraping apparatus demonstrating both the wear characteristics and the tensioning of the blade, and the relation thereof.

Another feature of the present invention is that the engineer, installer, or other user may correct the tensioning or degree of rotation selected according to the anticipated amount of wear on the doctor blade. FIG. 3 demonstrates the scraping of the present apparatus at different stages of wear on the scraper blade. FIG. 3 further demonstrates different arcs representing the diameter of the head pulley where the scraping is taking place. FIG. 3 demonstrates the present scraping apparatus installed on an 18-inch diameter pulley through a 36-inch diameter pulley. Upon analysis of FIG. 3, it is apparent that one would not want to exert 15° of tension (represented by G) on the transverse support member on a 36-inch diameter pulley, since when the blade wears down to metal channel, the belt may come into contact with the channel supporting the blade element (see FIG. 1). However, from FIG. 3, it can be seen that 15° of tension is appropriate in an 18-inch diameter pulley through a 24-inch diameter pulley, since the channel 21 would not come into contact with the belt. Accordingly, blade wear can be anticipated and planned on by the engineer or installer, and further damage to the belt can be prevented.

Figure 6:
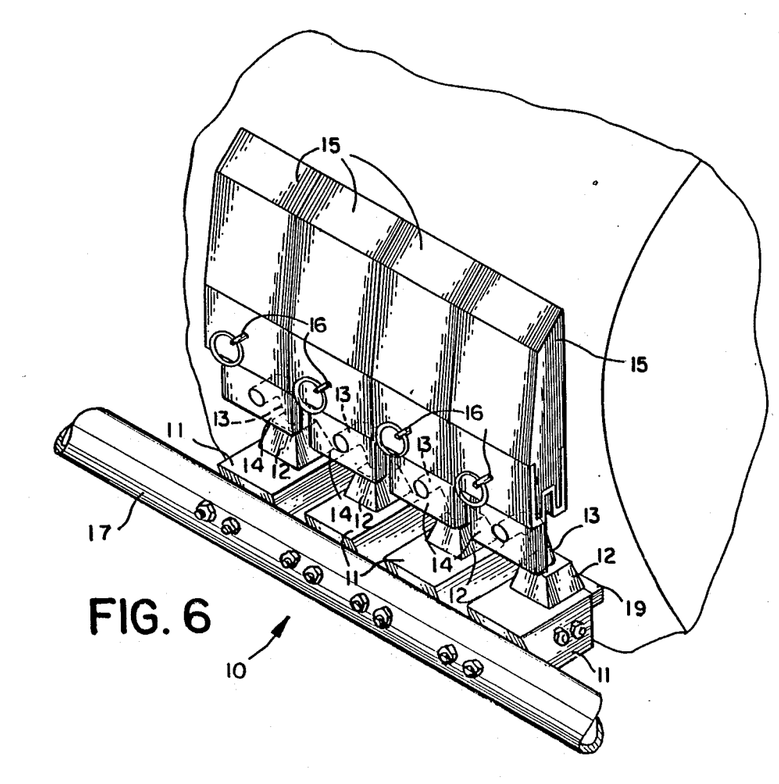
FIG. 6 is a perspective view of the conveyor belt scraping apparatus of the present invention.

Primarily due to the side-by-side abutting relation of the present scraping blades, one embodiment of the present design allows for each and every blade to be dependent upon each other for lateral support and pivotal stability. This structure can best be seen in FIG. 6. This prevents blade twisting by providing support for each neighboring blade. Also, the design causes the tension applied to the transverse support member to be subsequently transferred to each and every individual elastomeric torsion element, which in turn affects the tension, dampening and shock absorbing characteristics of each and every scraping blade. Accordingly, the tensioning, dampening and shock absorbing features of the present apparatus do not rely upon the ability of the blade composition (i.e., its durometer (hardness) or flexibility) for tensioning, dampening and shock absorption. Accordingly, in the present apparatus, the scraping blades may be composed of hard plastics, ceramic or steel.

The present invention may be embodied in other specific forms without departing from the spirit or essential attributes thereof and, accordingly, reference should be made to the appended claims, rather than to the foregoing specification as indicating the scope of the invention.

I claim:

1. An apparatus for cleaning the exposed surface of a conveyor belt on a cylindrical head pulley comprising:
   (a) a transverse support member positioned in spaced relation to the surface of the conveyor belt;
   (b) a plurality of blade support elements mounted on said transverse support member in an array across the belt width, each of said blade support elements including resilient means providing a point of rotation relative to said transverse support member; and
   (c) a plurality of scraping blades attached to said blade support elements, each blade having a transverse scraping edge defined between an end surface of the blade and a side surface which faces the conveyor belt, said side surface being substantially planar and extending substantially tangential to and resiliently biased radially inward into engagement with the belt on the cylindrical surface of the pulley, wherein each of said points of rotation is positioned inward towards the pulley relative to the planar surface of its associated scraping blade, to force said blade to pivot away from said belt surface upon impact by an object moving with the belt into engagement with the blade against said scraping edge.

2. An apparatus as in claim 1 positioned at between about 7 o'clock on the head pulley wherein each of said plurality of blade support elements mounts the scraping blades in side-by-side abutting relation across the belt's width, each blade extending into engagement with the belt surface.

3. An apparatus as in claim 1 wherein said transverse support member is a rotatable shaft extending parallel to said scraping edge substantially coplanar with said side surface, and biasing means to bias said rotatable shaft to urge said blade surface toward said belt surface.

4. An apparatus as in claim 1 wherein said scraping edge is positioned at 9 o'clock on the head pulley.

5. An apparats as in claim 1 wherein said blade support elements include elastomeric torsion elements.

6. An apparatus as in claim 1 wherein said scraping blades comprise elastomeric material.

7. An apparatus as in claim 1 wherein said scraping blades comprise polymeric material.

8. An apparatus as in claim 1 wherein said scraping blades comprise ceramic material.

9. An apparatus as in claim 1 wherein said scraping blades comprise steel.

10. An apparatus as in claim 6, further comprising ceramic beads embedded in the tips of each of said scraping blades adjacent its scraping edge.

11. An apparatus as in claim 7, further comprising ceramic beads embedded in the tips of each of said scraping blades adjacent its scraping edge.

12. An apparatus as in claim 1 wherein said blade support elements provide an angular movement of about 30° or less about said point of rotation.

13. An apparatus as in claim 1 wherein said blade support elements are attached to said transverse support member by a support bracket, said support elements further comprising a torsion element, a curved arm attached on open end to said torsion element, and an anchor plate attached on the opposing end of said support arm, said anchor plate being further attached on its opposing end to one of said plurality of scraping blades, and wherein said support arm has a degree of curvature sufficient to allow said scraping blade to be positioned such that the point of rotation is inward of the point of engagement of the blade with the belt surface.

14. An apparatus as in claim 13, further comprising a safety stop on said support bracket operable to engage the torsion element to limit the displacement of said torsion element to 30° or less.

15. An apparatus for cleaning the exposed surface of a conveyor belt on a cylindrical head pulley comprising:
a plurality of scraping blades, each blade having a transverse scraping edge defined between an end surface of the blade and a side surface which faces the conveyor belt, said side surface being substantially planar and extending substantially tangential to and resiliently biased radially inward into engagement with the belt on the cylindrical surface of the pulley;
a transverse support member positioned in spaced parallel relation to the scraping edge, said support being approximately in alignment with the plane of said side surface, and
a separate blade support element connecting each blade to said transverse support member so that said plurality of blades are in an array across the belt width, each blade support element including resilient means providing a point of rotation between said scraping edge and said transverse support member;
each said point of rotation being spaced radially inward between said transverse support member and the cylindrical head pulley to force said blade to pivot away from said belt surface upon impact by an object moving with the belt into engagement with the blade against said scraping edge.

16. Apparatus according to claim 15 wherein said transverse blade support element comprises a rotary shaft biased for rotation to urge said scraping edge against said belt surface, said resilient means comprising a two-part torsion device having one part mounted on said shaft by a bracket projecting radially from said shaft toward said pulley, and a second part carrying said blade support.

17. Apparatus according to claim 16 wherein said second part is normally positioned at right angles to said bracket.

18. Apparatus according to claim 17 wherein said resilient means includes stop means to limit angular movement of said second part from its normal position toward the center of said cylindrical pulley, so as to prevent relative displacement of said torsion device past the plane of said side surface.

* * * * *

UNITED STATES PATENT AND TRADEMARK OFFICE
CERTIFICATE OF CORRECTION

PATENT NO. : 4,962,845

DATED : October 16, 1990

INVENTOR(S) : A. Todd Gibbs

It is certified that error appears in the above-identified patent and that said Letters Patent is hereby corrected as shown below:

Column 1, line 29, "olean" should be --clean--;

Column 9, line 11, after "7" insert --and 10--;

line 23, "apparats" should be --apparatus line 47, "open" should be --one--;

Signed and Sealed this

Fourteenth Day of January, 1992

Attest:

HARRY F. MANBECK, JR.

*Attesting Officer*　　　　　*Commissioner of Patents and Trademarks*